(12) United States Patent
Reinisch et al.

(10) Patent No.: US 8,073,498 B2
(45) Date of Patent: Dec. 6, 2011

(54) METHOD OF OPTIMIZING POWER CONSUMPTION IN A WIRELESS DEVICE

(75) Inventors: William Reinisch, New York, NY (US); Craig Watson, Bassett Southampton (GB); David Wheatley, Tower Lakes, IL (US); Nitya Narasimhan, Lake Zurich, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 889 days.

(21) Appl. No.: 12/112,811

(22) Filed: Apr. 30, 2008

(65) Prior Publication Data

US 2009/0275367 A1 Nov. 5, 2009

(51) Int. Cl.
*H04B 1/38* (2006.01)
(52) U.S. Cl. ......................... 455/572; 455/574
(58) Field of Classification Search ............. 455/127.1, 455/343.4, 574, 343.2; 370/311, 338, 350; 381/70; 345/158, 157, 156; 128/903; 398/1; 307/66
See application file for complete search history.

(56) References Cited

U.S. PATENT DOCUMENTS

| | | | |
|---|---|---|---|
| 5,101,507 A * | 3/1992 | Jung | ............................ 455/127.2 |
| 6,738,151 B1 | 5/2004 | Kato | |
| 6,947,755 B1 | 9/2005 | Gould et al. | |
| 7,024,196 B1 | 4/2006 | Kotzin | |
| 7,111,177 B1 | 9/2006 | Chauvel et al. | |
| 7,136,917 B2 | 11/2006 | Kawai et al. | |
| 7,441,135 B1 * | 10/2008 | Chan et al. | ....................... 713/320 |
| 2001/0016506 A1 * | 8/2001 | Son et al. | ........................ 455/569 |
| 2005/0107109 A1 * | 5/2005 | Gunaratnam et al. | ......... 455/525 |
| 2005/0248317 A1 * | 11/2005 | Yang | .............................. 320/132 |
| 2005/0280397 A1 * | 12/2005 | Iwamoto | ....................... 320/132 |
| 2006/0229014 A1 * | 10/2006 | Harada et al. | ................ 455/41.2 |
| 2007/0085675 A1 * | 4/2007 | Darshan et al. | ........... 340/538.11 |
| 2007/0097962 A1 * | 5/2007 | Yoon et al. | ...................... 370/352 |
| 2008/0075028 A1 * | 3/2008 | Park et al. | ....................... 370/311 |
| 2010/0237696 A1 * | 9/2010 | Maleyran et al. | ................ 307/24 |

FOREIGN PATENT DOCUMENTS

| | | |
|---|---|---|
| KR | 10-2008-0021458 A | 7/2008 |
| WO | 2006/107856 A2 | 10/2006 |
| WO | 2006/125961 A1 | 11/2006 |
| WO | 2007/008883 A2 | 1/2007 |
| WO | 2008/026868 A2 | 3/2008 |

OTHER PUBLICATIONS

Kwang Sik Kim, "PCT/US2009/040318—PCT International Search Report and Written Opinion," WIPO, ISA/KR, Korean Intellectual Property Office, Daejeon, Republic of Korea, Nov. 24, 2009.

* cited by examiner

*Primary Examiner* — Nick Corsaro
*Assistant Examiner* — Mahendra Patel

(57) ABSTRACT

A method and apparatus are provided for operating a wireless communication device. The method includes the steps of providing a plurality of battery powered modules that are carried by a user and together operate as the wireless communication module (ensemble), detecting a battery reserve power level of a first module of the plurality of modules and transferring a processing function from the first module to a second module of the plurality of modules based upon the detected battery reserve power.

20 Claims, 2 Drawing Sheets

METHOD OF OPTIMIZING POWER CONSUMPTION IN A WIRELESS DEVICE

FIELD OF THE INVENTION

The field of the invention relates to communication devices and more particularly to wireless devices.

BACKGROUND OF THE INVENTION

Wireless communication devices are generally known. Wireless devices may be divided by function into voice devices such as cellular telephones and data devices such as PDAs or portable computers with wireless interfaces. Recent advances also include a large number of "smart" portable wireless devices that are able to handle both voice and data and typically have a wide range of functional capabilities.

When a wireless device is activated, the device automatically begins searching for a local base station. In order to facilitate the search for a base station, the base stations may transmit identification messages on one or more control channels. In order to locate a control channel of a local base station, the device may scan a series of channels by individually stopping on each channel and decoding any information on the channel in an effort to determine if a currently scanned channel is a control channel of a local base station.

Once the device locates a control channel, the device may register its presence with the base station. Once registered, the device may remain tuned to the control channel to place outgoing messages and/or voicecalls or to receive incoming messages and/or voicecalls.

Such wireless communication devices are portable and therefore, they are typically dependent upon a battery. While many devices have a battery level indicator, the indication of low battery level can often be missed leading to the inconvenience of an inoperative device. The wider array of functional capabilities may lead to increased power demands and furthermore, the rate at which battery power is consumed may vary greatly depending on the types of function performed and the frequency of use of those functions.

In order to avoid the inconvenience of a dead battery many people carry a spare battery or form a habit of recharging their batteries each night. While such practices are effective, they are overly burdensome to the end user. Accordingly, a need exists for better methods of extending battery life in portable communication devices, particularly the multi-functional devices described above.

SUMMARY

A method and apparatus are provided for operating a battery powered wireless communication device. The method includes the steps of providing a plurality of battery powered modules that are carried by a user and together operate as the wireless communication module (or ensemble), detecting a battery reserve power level of a first module of the plurality of modules and transferring a processing function from the first module to a second module of the plurality of modules based upon the detected battery reserve power and usage factors.

DETAILED DESCRIPTION OF AN ILLUSTRATED EMBODIMENT

Figure 1:
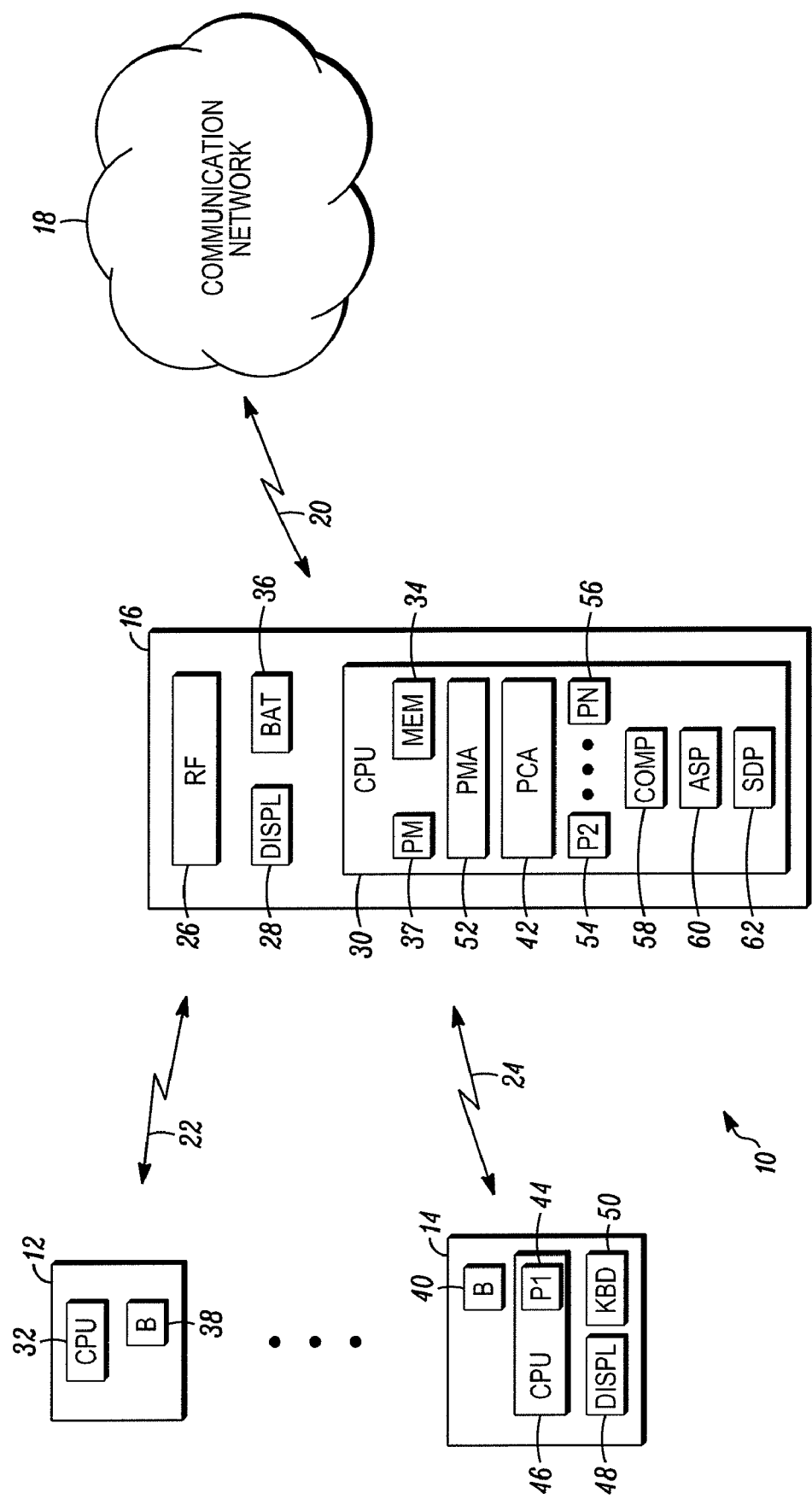
FIG. 1 is a block diagram of a wireless communication device (or ensemble) in accordance with an illustrated embodiment of the invention.
Figure 2:
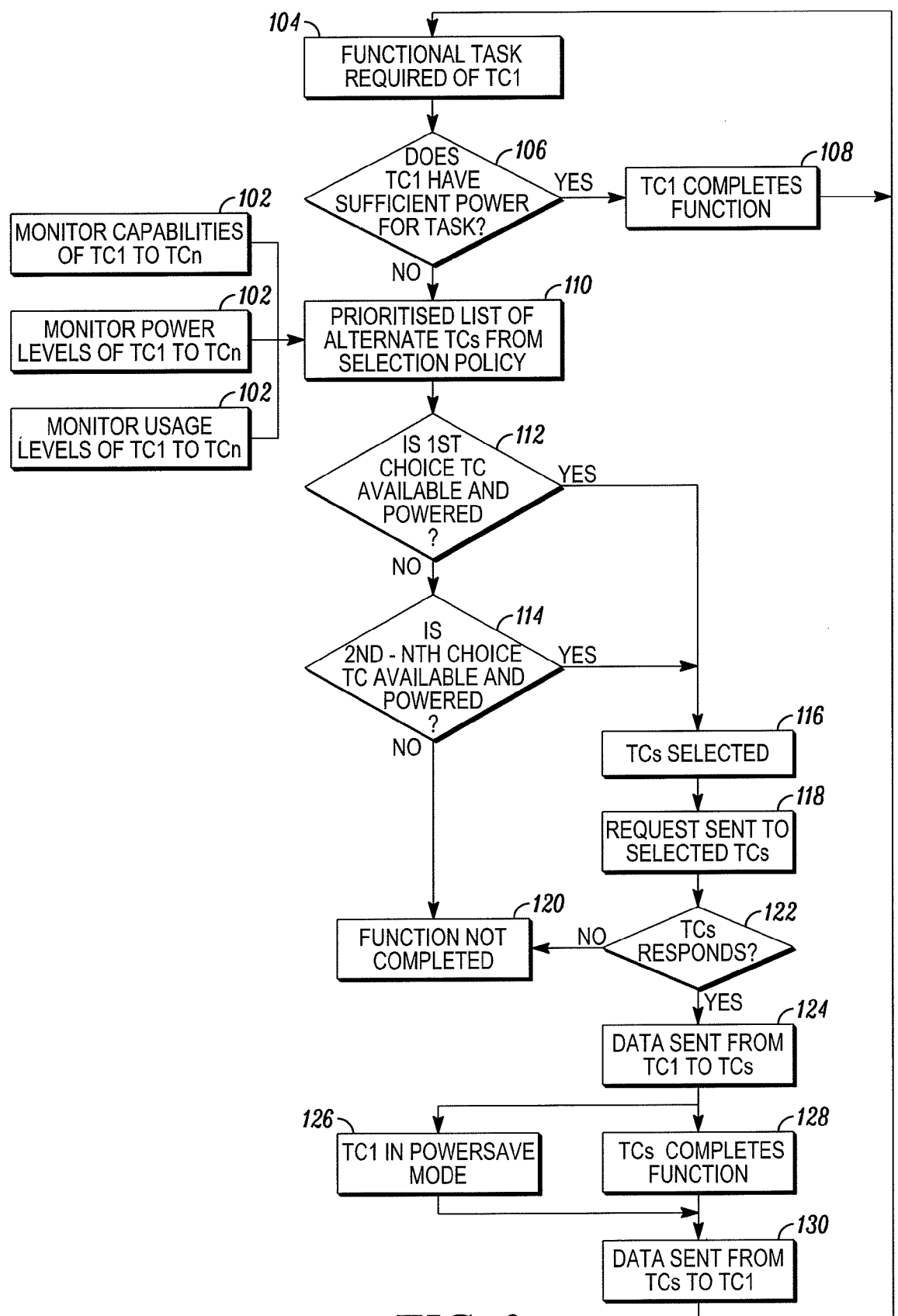
FIG. 2 is a flow chart of method steps that may be used by the device of FIG. 1.

FIG. 1 is a block diagram of a communication device 10 shown generally in accordance with an illustrated embodiment of the invention. FIG. 2 is a flowchart of method steps that may be followed by the device 10 of FIG. 1.

The communication device 10 includes a transceiver (smart) module 16 and one or more peripheral devices (thin clients) 12, 14. The transceiver module 16 is a dual capability transceiver device that can simultaneously exchange communicated signals on each of a pair of two-way channels. In this regard, the transceiver 16 can exchange two-way communicated signals under a first format and in a first frequency range (e.g., a cellular) with a local base station (not shown) of a local cellular communication network 18. The transceiver module 16 may also simultaneously exchange two-way communicated signals under a second format and in a second frequency range (e.g., Bluetooth) with each of the respective thin clients 12, 14.

The smart transceiver module 16 and thin clients 12, 14 are each battery powered by a respective battery 36, 38, 40. The use of the two-way signals under the second format allows the smart transceiver module 16 and thin clients 12, 14 to form a personal area network (PAN) or piconet. Together, the smart transceiver module 16 and thin clients 12, 14 form a portable communication device system 10 that may be located relatively close together in the immediate area of the user or distributed among the pockets, embedded within clothing and/or on or about the body of the user.

The peripheral modules 12, 14 may be referred to as "thin clients." As used herein, a thin client is a device with a processor where the processor is intended primarily to handle communication functions between a user interface and another device (the smart transceiver module). As described in more detail below, the thin clients 12, 14 may be used to share processing tasks based upon reserve battery capacity.

The smart transceiver module 16 and thin clients 12, 14 operate together as a single communication device or ensemble 10 to accomplish any of a number of different functions. For example, a relatively simple example may be the situation where the smart transceiver module 16 is a cellular telephone and the thin client 12, is a headset containing an earphone for insertion into the ear of a user and a microphone that extends towards the mouth of the user to detect speech from the user. In this example, the cellular telephone 16 may remain in a pocket of the user while the headset is supported on the ear of the user in a hands free manner. In this example, the user can place a telephone call by entering a called party number through a graphical user interface (GUI) 48 on a thin client 12, 14 or a GUI 28 on the cellphone 16 and activating a SEND button or softkey. Once the cellular call is set up, the cellphone 16 concurrently exchanges two-way voice information with the communication network 18 over a cellular channel 20 and at the same time exchanges that same two-way voice information with the Bluetooth headset 12 over a two-way Bluetooth channel. Once a call has placed, the user can return the cellphone 16 to his/her pocket for convenience. Calls can be received in much the same manner.

Setup of the communication system 10 in this example can be handled conventionally. The cellphone 16 and thin client 12 can be paired using a passkey provided by the user or the thin client 12 and cellphone may be paired automatically by activation of a PAIR button or softkey. Information may be exchanged between the cellphone 16 and thin client 12 using packets incorporating the source and destination addresses of the cellphone 16 and thin client 12. Information exchanges between the cellphone 16 and thin client 12 may also be encrypted.

Call setup through the communication system 18 may be handled conventionally. In this case a processor (CPU) 30 within the cellphone 16 may receive a called number through a GUI 28, 48 and, in response, compose a channel request that in turn is transferred to the communication system network 18 through a radio frequency (RF) unit 26 and cellular control channel 18. The communication system 18 may respond with a channel assignment. The CPU 30 may decode the channel assignment and instruct the RF unit 26 to tune to the assigned channel. During the call, the CPU 30 may also attend to maintenance of the cellular voice channel (e.g., handoff, timing adjustments, power adjustments, etc.).

Once the call channel has been set up between the cellphone 16 and communication system 18, the CPU 30 may also instruct the RF unit 26 to begin exchanging voice packets with the thin client 12. In this case, a first packet 22 from the cellphone 16 to the thin client 12 may activate the thin client 12 and instruct the thin client 12 to begin exchanging voice information. The thin client 12 decodes the packet and begins exchanging voice information between the user and the called party through the cellphone 16.

In a second example, the smart transceiver module 16 may, again, operate on a cellphone channel. In this example, the first thin client 12 is a headset and the second thin client 14 is a GUI. To make or receive calls, the user simply removes the GUI 14 from his pocket and enters called numbers or accepts calls. Once the user has made a selection, the user can return the GUI 14 to his pocket.

In still another example, one or both of the peripherals 12, 14 may be health statistics modules provided by a sports product company or healthcare provider. In this case, the health statistics modules may collect data from the user (e.g., heart rate, blood pressure, breathing rate etc.) and either store the statistics in a memory 34 of the smart transceiver module 16 or transfer the statistics in real time to a physician or medical information storage facility accessible through the communication network 18.

In a still further example, the device 10 may be based upon the MODU concept in which the smart transceiver module 16 is a tiny cell phone transceiver the size of a business card (e.g., 2"×3½"×¼") that slips into a variety of sleeves in the thin clients 12, 14 the latter offering a number of different, respective functionalities (e.g., e-mail, Internet access, voice, music, GPS, etc.).

In any of these MODU examples, the smart transceiver module 16 may be combined with a peripheral thin client 12, 14 that provides the appropriate functionality for a specific user environment. Using the MODU concept, a user may slip the smart transceiver module 16 into a cell phone sleeve 12, 14 for use during the evening. In this case, the cell phone sleeve 12, 14 provides the microphone, speaker and GUI needed for voice communication through the cellular network. Alternatively, during business hours, the user may slip the MODU transceiver module 16 into an e-mail sleeve to remain accessible for important e-mail contacts.

In use, the modules 12, 14, 16 consume battery power at different power rates. For example, when used as a conventional cellphone, the transceiver 16 would consume power at a relatively rapid rate from the battery 36 while transceiving on the cellular channel 20 whether the user is talking or not. Alternatively, when the device 10 is being used as an e-mail terminal, then the rate of power consumption from the battery 36 would be relatively low.

Similarly, if the thin client device 10 were used as a music player, then the smart transceiver 16 would consume power from the battery 36 at a relatively low rate, since the CPU 30 of the transceiver 16 may only need to access music files within memory 34 and transfer such files to the music player 12, 14. In this case, the music player 12, 14 may consume considerably more power from its battery 38, 40 than the transceiver 16. If the music were stored in memory in the client device, then the smart module may consume no power in the performance of this function.

In order to conserve and optimize power use, the smart transceiver module 10 may monitor 102 a power level of its respective batteries 36, 38, 40 and transfer or deactivate power consuming features accordingly. Under one preferred embodiment, the deactivation of power consuming features is accomplished by transferring data processing features (programs) among devices (i.e., between thin clients 12, 14, 16). Under another preferred embodiment, once data processing features have been transferred from a first module to a second module, the first module is deactivated 126.

Included within each of the modules 12, 14, 16 may be a power monitoring device 37. The power monitoring device 37 may be an integrated device that monitors a battery voltage and that determines a battery reserve based upon that voltage. The power monitoring device 37 may provide a continuous reading of battery reserve (e.g., minutes, hours, etc.) or that provides an output signal when the battery 36, 38, 40 reaches a discharge threshold value.

A power monitoring application 52 within each module 12, 14, 16 may monitor the reserve power of its own battery and transfer a power reading to the other modules 12, 14, 16. Associated with the power monitoring application 52 may be a power control application 42 that moves processing functions among the modules 12, 14, 16 based upon the relative level of the battery power available in each of the modules 12, 14, 16.

In a first example, the communication device 10 may be a cellular telephone with a headset 12 and GUI 14 coupled to the cellular transceiver 16 using Bluetooth. In this case, if the user should wish to place a call, the user may enter the number through a keyboard 50. A program 44 within a CPU 46 of the GUI 14 may receive the number and compose a MAKE CALL message that is transferred through a call processing application 54 within the transceiver 16 to the communication network 18.

In response, to receipt of the MAKE CALL message, the communication network 18 may begin processing the call and return a PROCESSING CALL message to the transceiver 16. The call processing application 54 may receive the CALL PROCESSING message and forward the message to the GUI 14. The GUI 14, in turn, may display the PROCESSING CALL message on the display 48 of the GUI 14 and transmit a ring tone to the headset 12.

Once a call connection has been completed with the called party, the communication system 18 sends a channel assignment message back to the communication device 10 identifying the channel. The message is received by the call processing application 54 within the CPU 30 of the transceiver 16 and is processed accordingly. In this case, the call processing application 54 may also send a CALL COMPLETE message to the GUI 14. In response, the GUI 14 may generate a message on the display 48 announcing call completion. In addition, the call processing application 54 may instruct the RF unit 26 to tune to the identified channel. The call processing application 54 may also assign a transcoder application 54 to exchange packets between the headset 12 and assigned channel 20 through the RF unit 26 and, in response, the user and called party may begin conversing.

During normal operation, power control applications 42 within one or more of the CPUs 30, 32, 46 monitor the power level of the batteries 36, 38, 40. If the power level of one of the batteries 36, 38, 40 falls below some threshold value, then the power control application 42 may take steps to reduce the power consumption within that module 12, 14, 16.

For example, if the power control application 42 should determine that the power level of a battery 36, 38, 40 of a module 12, 14, 16 had fallen below some threshold reserve value or level, then the power consumption within the module 12, 14, 16 may be reduced or the module 12, 14, 16 may even be deactivated. Reduction in power consumption may mean moving one or more data processing applications from the module 12, 14, 16 with a low reserve power level to a module 12, 14, 16 with a relatively high reserve power level. Moving or transferring an application means deactivating the application on a one module 12, 14, 16 and reactivating a substantially identical application on another module 12, 14, 16.

For example, in the case where the module 14 provides a GUI interface, then if a low power level in battery 40 were detected, then a processing application (software module 44) used to process input and output of the display 48 and keyboard 50 may be moved to reduce power consumption within the module 14 to some minimum level. In this case, the processing accomplished by the application 44 may be moved to another module (e.g., 12 or 16) with a higher reserve power. It may be noted in this regard that software applications 44 may be transferred among modules 12, 14, 16 or a comprehensive set of backup software modules 44 may be pre-saved in a memory 44 of each module 12, 14, 16.

Once the processing of the application 44 has been moved to another module 12 or 16, the CPU 46 of the GUI 14 may service the transferred application 44 by simply exchanging data with the application 44 through the channel 24 or channels 24 and 22. For example, where the module 14 functions as a GUI, then the CPU 46 may continue to scan a set of softkeys on the display 48 and/or any buttons or switches on a keyboard 50 for activations. Upon detection of activations, the CPU 46 may transfer the incidences of activation to the transferred application 44 (now operating from within module 16) for processing of such data.

Similarly, data to be shown on the display 48 may be processed within the transferred application into an appropriate format (e.g., bitmap) and transferred to the CPU 46 for presentation on the display 48. Alternatively, the application 44 may only transfer changes for updating the display 48.

Under another example, the power control application 42 may constantly monitor battery reserve and rearrange processing sites accordingly. For example, as each battery reserve reading is received, a comparator 58 may be used to compare a relative battery reserve of each module 12, 14, 16. Based upon the relative reserve capacity, the modules 12, 14, 16 may be prioritized or ordered 110 with the module 12, 14, 16 with the greatest relative reserve listed first and the module 12, 14, 16 with the least relative reserve listed last.

Based upon the relative reserves, the power control application 42 may determine a difference in remaining operating time for each module 12, 14, 16. It should be noted in this regard that the shortest relative reserve for any of the modules 12, 14, 16 (and especially the smart module 16) under normal conditions would determine the maximum operating time for the entire device 10. Under a further example, the power reserve in the smart transceiver module 16 may be such that wireless communication with the cellular network 18 is not possible. However, if a thin client 12, 14 still has a reserve of power, then it may still continue to carry out it's specialized function (e.g., image, video capture, email preparation, music playing etc.) but it would not be possible to transmit the captured video, image or email over the cellular network until such time as the smart transceiver module 16 has sufficient power. As a consequence, a thin client may still have utility to the user, even though wireless cellular communication is not possible.

In order to maintain full operation of the device 10 for as long as possible, the power control application 42 may use a two-step process to determine whether a change in processing sites is needed. It should be noted in this regard that a change in processing sites of at least some applications 54, 56 could result in slower operation of the device 10. The slower operation may occur, for example, because of the increased volume of data that may need to be exchanged through the connections 22, 24. The slower operation of the device 10, however, may be justified by the fact that the relocation of applications allows for the extended or continued full functional capabilities of the device 10.

The first step of the two-step process may be the use of the comparator 58 to determine a difference in reserve (in minutes) between the module 12, 14, 16 with the greatest relative reserve and the module 12, 14, 16 with the least relative reserve. The reserve in each case may be determined by dividing a remaining battery capacity (in percent) by the change in battery capacity per time period.

The second step in the two-step process may be to compare the difference in reserve with a threshold value. If the difference in reserve exceeds the threshold value, then the power control application 42 may begin moving applications 54, 56 from the module 12, 14, 16 with the least relative reserve to the module 12, 14, 16 with the greatest relative reserve.

Operating in conjunction with the power control application 42 may be an application selection processor 60. The application selection processor 60 may maintain a list of applications 54, 56 operating within each module 12, 14, 16, a list of I/O requirements and a list of where the data of each I/O is received from a source or sent to a destination. When a determination is made to move applications 54, 56 from a module 12, 14, 16 with a low relative power reserve, the application selection processor 60 may first identify any application 54, 56 with relatively low I/O requirements or applications with I/O that predominantly relies upon other modules 12, 14, 16 for its data. The application selection processor 60 may form an ordered list of applications 54, 56 for transfer to other modules 12 14, 16 based upon the impact of transfer on the overall speed of the device 10.

Once the ordered list has been formed, the power control application 42 may begin transferring applications 54, 56. The control application 42 may continue to transfer applications 54, 56 from the ordered list starting with the one with the least impact until the power reserves of the modules 12, 14, 16 are substantially equal.

In another example, the power control application 42 may determine that the battery capacity (in percent) of a module 12, 14, 16 has reached some minimum threshold value and the module 12, 14, 16 needs to be shut down. In this case, the power control application 42 may activate a shut down processor 62 that transfers any remaining applications 54, 56 to other modules 12, 14, 16 and deactivates the module 12, 14, 16 with the depleted battery.

By transferring the processing features performed by the applications 44 from the first module 14 to the second module 16, power requirements and power use within the first module are significantly reduced. Power requirements within the first module 14 may be reduced even further by shutting down the module 14 entirely. In the case of a GUI, the complete shutdown is justified by the fact that the GUI 14 would be used only intermittently. If the user were to want to place another call or end the first call, then the user may simply activate a reset (e.g., a wake up) button on the GUI 14.

In another example, the power control application 42 may detect a relatively low power level on another module (e.g., the smart transceiver 16), and the power control application 42 may proceed in a similar manner. In this case, a call processing application 54 may be transferred from the module 16 to another module 14. While the RF portion 26 of the transceiver 16 cannot be deactivated, the processing within the module 16 can be reduced by transferring applications. In addition to the call processing application, other processing applications 54, 56 (e.g., call maintenance application, CODEC applications, etc.) could be transferred to other modules 12, 14 without significantly interfering with the overall operation of the device 10.

Power reduction within a MODU device 10 may be accomplished in a similar manner. In the case of the MODU transceiver 16 combined with a cellphone sleeve 12, 14 a GUI application within the cellphone sleeve 12, 14 may be transferred to the MODU transceiver 16 or vice versa.

The case where the MODU transceiver 16 is combined with an e-mail sleeve 12, 14 is also quite similar. In this case, processing applications may again be moved among modules 12, 14, 16 with the e-mail sleeve being deactivated in some cases except for where an e-mail arrives or the user should wish to send an e-mail.

The device 10 enhances the usefulness of ensembles of modules 12, 14, 16 by sharing the load of power consuming tasks and functions by breaking down the components of the user's task and distributing these task components among the available modules 12, 14, 16 so as to balance the power requirements with the power available in each module 12, 14, 16. For example, a user task may break down to text entry or processing associated with the user interface, the processing or coding of media content, transmission over the network, etc. These tasks are dynamically distributed (using the Bluetooth connection) among the modules 12, 14, 16. In this way, it is possible to conserve power in a thin client which had been heavily used and was low in power, and shift the power demand to another device which had been used less heavily.

Similarly, power optimization may also be achieved by off-loading a function in its entirety (rather than breaking it down into components) in cases where multiple thin clients have the same or substantially similar functionality, but different power levels. A background task which is being handled by a first thin client, for example, may also be off-loaded to another thin client in the ensemble in cases where there is sufficient power in the first thin client, but it has a much higher usage level than the other thin client. In this way, power can be conserved in those devices which are of the greatest utility to the user.

In another example, the device 10 may be used to capture video information. In this case, the thin client 12, 14 may be used to collect pixel information from the video camera and format the collected information for transmission to a third party through the smart transceiver 16.

In the event of a low battery in the video camera (e.g., peripheral device 12), the task of formatting the pixel information may be transferred to another device 14, 16. In this case, the camera 12 transfers the raw pixel information to the other device (e.g., peripheral device 14) through the Bluetooth channels 22, 24. Within the other peripheral device 14, the video information may be formatted into the appropriate format (e.g., jpeg). Once the video information has been properly formatted, the formatted video information may be transferred to the smart transceiver 16 for transfer to the third party.

In general, the monitoring of thin clients 12, 14 may occur via a number of processing loops. For example, a first processing loop 104, 106, 108 may occur each time a frame of video is to be transferred from a video camera 12 to another device 14, 16. In this case, the functional task may be detected 104 and a calculation may be performed 106 to determine if the thin client 12 has enough power. If so, then the task is completed 108.

If not, then the thin clients 12, 14 are prioritized 110. A determination is made as to whether the thin client 12, 14 with the greatest amount of power is available and powered 112. If so, then that thin client is selected 116 to receive additional processing task(s) and a request is sent 118 to that thin client to begin processing the task(s).

If the thin client with the highest priority is not available, then a determination is made as to whether the next thin client is available and powered 114. If so, then the next thin client is selected 116 to receive additional processing task(s) and a request is sent 118 to that thin client to begin processing the task(s). If an alternative thin client is not available or the thin client does not respond 122, then the function is not completed 120.

Alternatively, if a thin client responds 122, then data is sent 124 from the thin client with a power deficiency to the alternate thin client. The alternate thin client may then process the data to complete the function 128 while the transferring thin client is deactivated or enters a power saving mode 126. The data may be processed by the alternate thin client and returned to the original thin client 130 and the process continues.

It should be noted that the process of FIG. 2 involves the real-time monitoring of the capabilities, power levels and usage levels to form the prioritized list of available thin clients (TCs). If the power level of a first thin client (TC1) is low, then the process becomes more responsive to identifying an alternative device. When called upon to make a function transfer, this selection policy may additionally carry out a power "trade-off" assessment, whereby the power cost of transmitting the data is assessed relative to the power saving of having another TC carry out the function. This may be used to provide a better result than simply comparing the two TCs and determining the net power cost of having another TC carry out the function. For example, TC1 might be very heavily used and important to the user while TC2 (which actually has less power than TC1) is rarely used. If the projected use of TC1 is much higher than TC2, then the task may still be transferred to TC2 even though the power level of TC2 is less than TC1.

A specific embodiment of a method for reducing battery power consumption has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method of optimizing power consumption of a wireless communication device comprising:

providing a plurality of battery powered modules that are carried by a user and together operate as a single wireless communication device;

detecting, by a power monitoring application within a first module of the plurality of battery powered modules, a battery reserve power level of the first module of the single wireless communication device;

transferring, by a power control application within the first module, a processing function from the first module to a second module of the plurality of battery powered modules of the single wireless communication device based upon the detected battery reserve power level of the first module;

comparing a reserve power level among the plurality of modules;

prioritizing the plurality of battery powered modules based upon the relative battery reserve power levels of each of the plurality of battery powered modules;

determining a difference in remaining operating time for each of the plurality of battery powered modules based on the priority; and communicating using the single wireless communication device based on the remaining operating time.

2. The method of claim 1 further comprising deactivating the first module.

3. The method of claim 1 further comprising the plurality of modules communicating through a Bluetooth channel.

4. The method of claim 1 further comprising selecting a module with a greatest relative reserve power level as the second module.

5. The method of claim 1 further comprising defining at least one of the plurality of modules as a cellular transceiver.

6. The method of claim 1 wherein the wireless communication device further comprises a personal area network.

7. A wireless communication device comprising:

a plurality of battery powered modules that are carried by a user and that together operate as a single wireless communication device;

means for detecting a battery reserve power level of a first module of the plurality of battery powered modules of the single wireless communication device;

means for transferring a processing function from the first module to a second module of the plurality of battery powered modules of the single wireless communication device based upon the detected battery reserve power level of the first module;

means for comparing a reserve power level among the plurality of modules;

means for prioritizing the plurality of battery powered modules, operating together as the single wireless communication device, based upon the relative battery reserve power levels of each of the plurality of battery powered modules;

means for determining a difference in remaining operating time for each of the plurality of battery powered modules based on the priority; and wherein the single wireless communication device communicates in accordance with the remaining operating time.

8. The wireless communication device as in claim 7 further comprising means for deactivating the first module.

9. The wireless communication device as in claim 7 further comprising means for communicating among the plurality of modules through a Bluetooth channel.

10. The wireless communication device as in claim 7 further comprising means for selecting a module with a greatest relative reserve power level as the second module.

11. The wireless communication device as in claim 7 further comprising means for defining at least one of the plurality of modules as a cellular transceiver.

12. The wireless communication device as in claim 11 further comprising means for providing a voice channel by combining the cellular transceiver with at least one other module of the plurality of modules.

13. A wireless communication device comprising:

a plurality of battery powered modules of a single wireless communication device that are carried by a user and that together operate as a wireless personal area network;

a power monitoring application that detects a battery reserve power level of a first module of the plurality of battery powered modules of the single wireless communication device; and a power control application that transfers a processing function from the first module to a second module of the plurality of battery powered modules of the single wireless communication device based upon the detected battery reserve power level of the first module;

a comparator that compares a reserve power level among the plurality of modules; and wherein the power control application further prioritizes the plurality of battery powered modules, operating together as the single wireless communication device, based upon the relative battery reserve power levels of each of the plurality of battery powered modules and further wherein the power monitoring application determines a difference in remaining operating time for each of the plurality of battery powered modules based on the priority; and wherein the single wireless communication device communicates in accordance with the remaining operating time.

14. The wireless communication device as in claim 13 further comprising a deactivation processor that deactivates the first module.

15. The wireless communication device as in claim 13 further comprising a Bluetooth channel that communicates information among the plurality of modules.

16. The wireless communication device as in claim 13 further comprising an application selection processor that selects a module with a greatest relative reserve power level as the second module.

17. The wireless communication device as in claim 13 wherein at least one of the plurality of modules further comprises a cellular transceiver.

18. The method of operating the wireless communication device as in claim 1 wherein the plurality of battery powered modules, operating together as the single wireless communication device, share processing tasks based upon battery reserve power levels of each of the plurality of battery powered modules.

19. The wireless communication device as in claim 7, wherein the plurality of battery powered modules, operating together as the single wireless communication device, share processing tasks based upon battery reserve power levels of each of the plurality of battery powered modules.

20. The wireless communication device as in claim 13, wherein the plurality of battery powered modules, operating together as the single wireless communication device, share processing tasks based upon battery reserve power levels of each of the plurality of battery powered modules.

* * * * *